United States Patent
Chawanya et al.

(10) Patent No.: US 8,467,152 B2
(45) Date of Patent: Jun. 18, 2013

(54) ACTUATOR LATCHING MECHANISM FOR MAGNETIC DISK DRIVE

(75) Inventors: Takeshi Chawanya, Kanagawa (JP);
Mutsuro Ohta, Kanagawa (JP);
Masakazu Sasaki, Kanagawa (JP)

(73) Assignee: HGST Netherlands B.V., Amsterdam (NL)

(*) Notice: Subject to any disclaimer, the term of this patent is extended or adjusted under 35 U.S.C. 154(b) by 614 days.

(21) Appl. No.: 12/284,853

(22) Filed: Sep. 24, 2008

(65) Prior Publication Data
US 2009/0086376 A1 Apr. 2, 2009

(30) Foreign Application Priority Data

Sep. 28, 2007 (JP) ................................ 2007-255802

(51) Int. Cl.
*G11B 5/54* (2006.01)
*G11B 21/22* (2006.01)

(52) U.S. Cl.
USPC ........................................................ 360/256

(58) Field of Classification Search
USPC .................................... 360/256, 256.2, 256.6
See application file for complete search history.

(56) References Cited

U.S. PATENT DOCUMENTS

| 5,875,075 A | 2/1999 | Hickox |
| 6,529,349 B1 | 3/2003 | Byun et al. |
| 6,535,358 B1 * | 3/2003 | Hauert et al. .............. 360/256.2 |
| 6,731,468 B2 | 5/2004 | Williams et al. |
| 2006/0215329 A1 | 9/2006 | Arikawa |
| 2007/0146937 A1 | 6/2007 | Akama et al. |

FOREIGN PATENT DOCUMENTS
EP 1564726 A 8/2005

OTHER PUBLICATIONS

The Extended European Search Report corresponding to the European Application No. 08013031.3, date of mailing Nov. 11, 2008, 7 pages total.

* cited by examiner

*Primary Examiner* — Joseph Haley
*Assistant Examiner* — Gustavo Polo

(57) ABSTRACT

Embodiments of the present invention provide an inexpensive latching mechanism having a necessary and sufficient function to hold an actuator of a magnetic disk drive and including a latch formed in a one-piece structure. According to one embodiment, a latching mechanism for a magnetic disk drive includes a latch lever, a hook, for latching an actuator, extending vertically downward from the latch lever, and a bar, to be pressed by an actuator at its home position in a closing direction, extending vertically downward from the latch arm. A steel pin is attached to the latch lever to urge the latch in an opening direction by a magnetic force.

11 Claims, 8 Drawing Sheets

(a)

(b)

(a)

(b)

(a)

(b)

ACTUATOR LATCHING MECHANISM FOR MAGNETIC DISK DRIVE

CROSS-REFERENCE TO RELATED APPLICATION

The instant nonprovisional patent application claims priority to Japanese Patent Application No. 2007-255802 filed Sep. 28, 2007 and which is incorporated by reference in its entirety herein for all purposes.

BACKGROUND OF THE INVENTION

In a magnetic disk drive, a magnetic head held by an actuator mechanism above a rotating magnetic disk is located on a predetermined track, to write or read data to or from the magnetic disk. A data recording area is formed on the magnetic disk. When the operation of the magnetic disk drive is ended, the magnetic head is moved out of the recording area to a predetermined position to protect data, and is held at the predetermined position while the magnetic disk drive is not in operation.

In some cases, the actuator mechanism is moved and the magnetic head is moved into the data recording area when an external shock is given to the magnetic disk drive while the magnetic disk drive is not in operation, which might cause destruction of data. Therefore, the magnetic disk drive needs to be provided with a latching mechanism for holding the actuator mechanism at the predetermined position, even if a shock is given to the magnetic disk drive. A magnetic latching mechanism and an inertial latching mechanism are representative latching mechanisms.

A known magnetic latching mechanism attracts an iron piece attached to an end part of an actuator by a magnet embedded in a rubber member to hold the actuator in place. The magnetic latching mechanism needs to attract the actuator by a strong magnetic attraction to hold the actuator in place under shocks. In such a case, in a magnetic disk drive having a VCM having a small torque constant achieved by reducing the amount of the magnet, the VCM cannot generate a torque sufficient to separate the actuator from the magnetic latching mechanism at the start of operation. If the actuator is held by magnetic attraction of a magnitude that permits separating the actuator from the magnetic latching mechanism, the actuator cannot be held in place when a shock is given.

A known inertial latching mechanism is provided with a short lever and a long lever in combination to cope with both a clockwise external shock and a counterclockwise external shock. This known inertial latching mechanism that needs to use the short and the long lever in combination needs many parts, much assembling work and place a limit to the reduction of the cost.

An inertial latching mechanism of one-piece construction provided with a built-in crash stop is disclosed in Japanese Patent Publication No. 2002-319259 ("Patent document 1").

In recent years, magnetic disk drives which are used as a storage device for conventional computers have become widely used in the field of domestic electric utensils including, for example, DVD recorders incorporating a magnetic disk drive. In the field of domestic electric utensils, performance requirements for magnetic disk drives are not so severe as in the field of applications to computers. Instead, it is demanded that their prices be held low.

Therefore, in designing a magnetic disk drive, it is necessary to reduce the amount of materials and the number of parts ensuring the minimum necessary functions to reduce the part cost and the assembling cost of the magnetic disk drive. For example, the access time of a magnetic disk drive for a domestic electric utensil may be longer than that of a magnetic disk drive for a computer and the amount of the magnet for the voice coil motor (VCM) for driving the actuator of the magnetic disk drive can be reduced to reduce the cost.

Reduction of the cost of the inertial latching mechanism disclosed in Patent document 1 is expected through the employment of the one-piece construction. However, the crash stop needs to be disposed as a separate single-function part to enable the crash stop to exercise the basic shock absorbing function thereof satisfactorily. The inertial latching mechanism is disposed in the same plane as the coil support of an actuator that engages with the actuator. Therefore, the inertial latching mechanism needs to be installed in a space wide enough to avoid the inertial latching mechanism overlapping the coil support. A metal insert, namely, a steel pin, is driven into the inertial latching mechanism and an attractive force generated by a leakage magnetic flux from the magnet of the VCM acts on the metal insert. Therefore the inertial latching mechanism is rotationally biased in a predetermined direction.

BRIEF SUMMARY OF THE INVENTION

Embodiments of the present invention provide an inexpensive latching mechanism functioning to hold an actuator of a magnetic disk drive, and including a latch formed in a one-piece structure. According to one embodiment, a latching mechanism for a magnetic disk drive includes a latch lever, a hook, for latching an actuator, extending vertically downward from the latch lever, and a bar, to be pressed by an actuator at its home position in a closing direction, extending vertically downward from the latch arm. A steel pin is attached to the latch lever to urge the latch in an opening direction by a magnetic force.

DETAILED DESCRIPTION OF THE INVENTION

Figure 1:
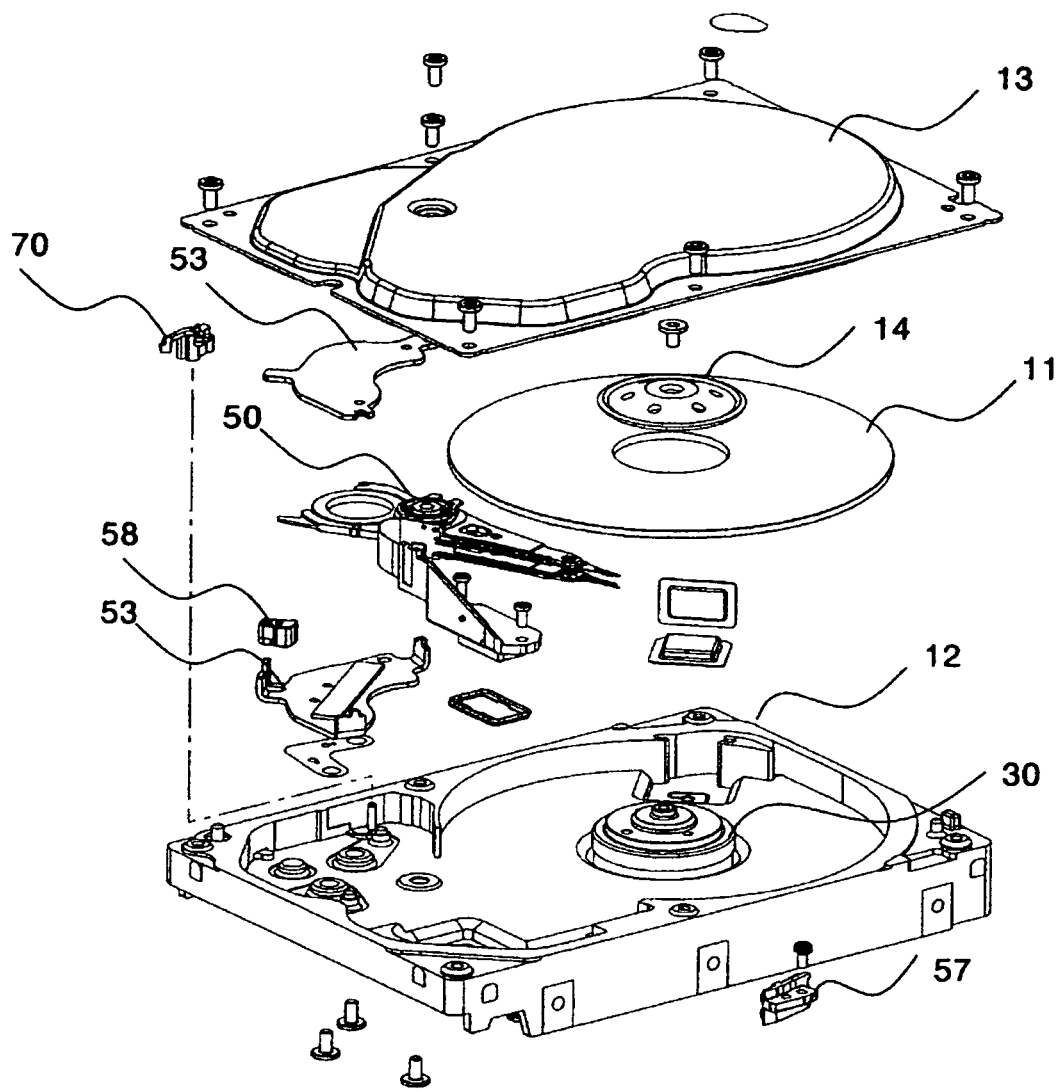
FIG. 1 is an exploded perspective view of a magnetic disk drive relevant to an embodiment of the present invention.

Embodiments of the present invention relate to a magnetic disk drive and, more specifically, to a latching mechanism for holding an actuator at a predetermined position while the actuator is not in operation.

Embodiments of the present invention have been made in view of the foregoing, and it is therefore an object of embodiments of the present invention to provide a latching mechanism having a function sufficient to hold an actuator of a magnetic disk drive provided with a crash stop as an individual part when an external shock is given to the magnetic disk drive, capable of efficiently using a space in the magnetic disk drive, having a small number of component parts and capable of being assembled by a simple assembling process.

An actuator latching mechanism according to embodiments of the present invention for a magnetic disk drive latches an actuator included in the magnetic disk drive and holds the actuator at its home position when a shock is given to the magnetic disk drive with the actuator positioned at the home position. The actuator latching mechanism is a one-piece structure including a hook and a bar formed vertically below a latch lever.

In the actuator latching mechanism, the latch lever, and a part formed on a coil support part of the actuator and capable of engaging with or of coming into contact with the latch are arranged so as to overlap each other three-dimensionally in a state in which the actuator is at the home position.

The actuator latching mechanism is provided with a steel pin which is attracted by a magnet included in a voice coil motor.

The steel pin of the actuator latching mechanism is on the upper side of the coil support part of the actuator in a state in which the actuator is at the home position.

The actuator latching mechanism is provided with a counterweight on the opposite side of the hook or the bar with respect to the rotational shaft of the latch, and the center of gravity of the latch lies within the diameter of an opening formed in the latch lever to receive the pivotal pin.

Embodiments of the present invention can provide a magnetic disk drive provided with a latching mechanism capable of holding an actuator on a ramp when a shock is externally given to the magnetic disk drive, simple in construction and excellent in ease of assembly.

Embodiments to which the present invention is applicable will be described below. The following description describes embodiments of the present invention. The present invention is not limited to the following embodiments. Proper omission and simplification are made in the following description and drawings to clarify explanation. Persons skilled in the art can readily change, add and convert the elements of the following embodiments without departing from the scope of the present invention. In the drawings, like components are designated by the same reference characters and duplicate explanation is omitted to clarify explanation.

The general construction of a magnetic disk drive will be described to facilitate understanding features of embodiments of the present invention.

FIG. 1 is an exploded perspective view of a magnetic disk drive 10 related with an embodiment. A magnetic disk 11, namely, a data storage medium, is a nonvolatile recording disk having a magnetic layer to be magnetized for data recording. A base 12 has an open upper end covered with a cover 13 fastened to the base 12 with a gasket (not shown) held between the base 12 and the cover 13. Thus, a disk enclosure is formed. The component parts of the magnetic disk drive 10 are contained in an airtight fashion in the disk enclosure. A spindle motor 30 is attached to the base 12. The magnetic disk 11 is fastened to the spindle motor 30 by a clamp 14. The magnetic disk 11 is driven for rotation at a predetermined angular velocity (velocity) by the spindle motor 30. The magnetic disk 11 remains stationary while the magnetic disk drive 10 is not in operation. An actuator 50 holds and moves a head gimbals assembly (HGA) 40 (see FIG. 2). The actuator 50 is held for swinging by a pivot assembly 51 including a shaft supported in a bearing. Indicated at 53 is a voice coil motor (VCM), and at 57 is a ramp on which is held a head slider 41 (see FIG. 2) retracted from a position above the surface of the magnetic disk 11 upon the stop of the rotating magnetic disk 11.

Figure 2:
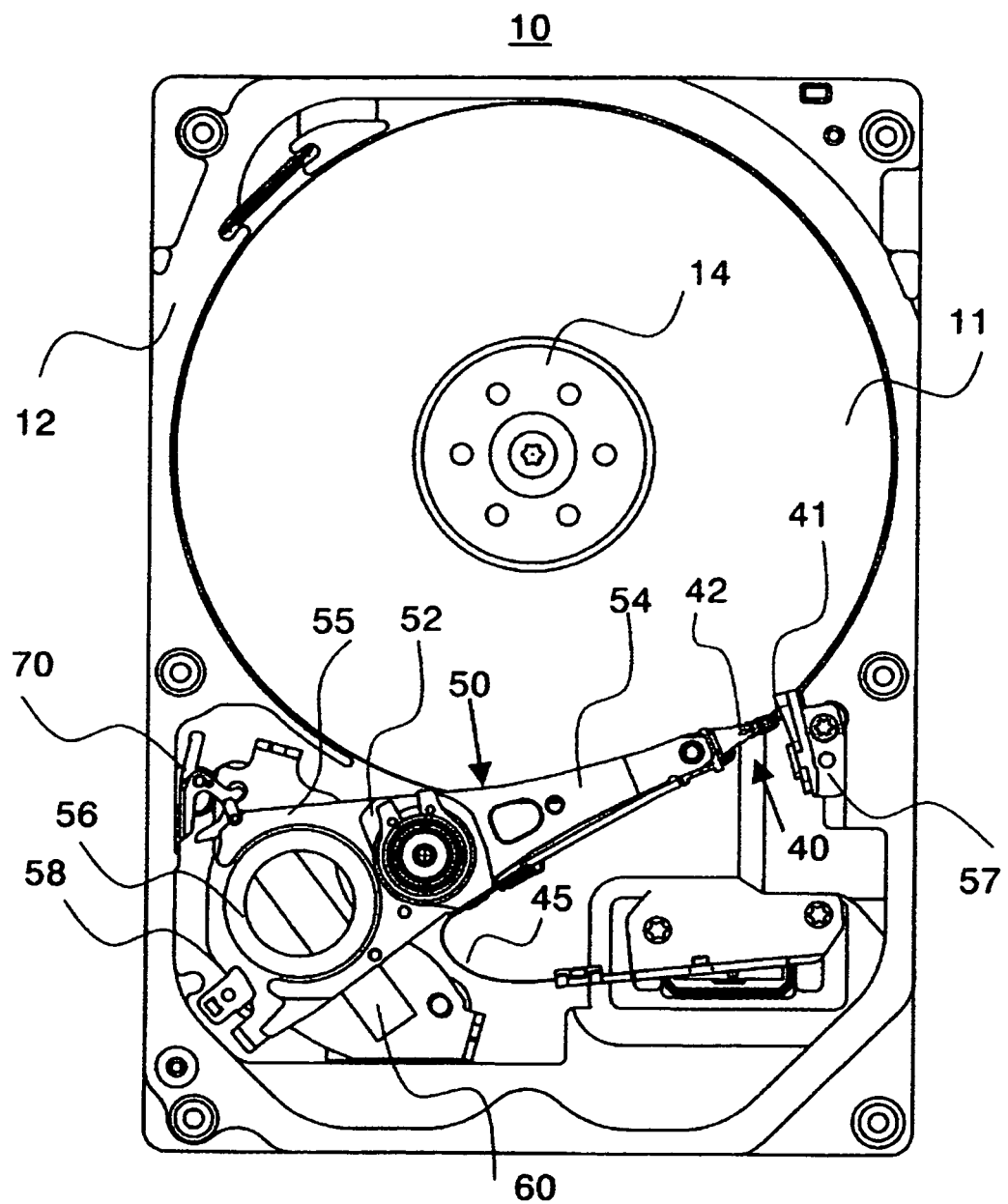
FIG. 2 is a plan view of a magnetic disk drive relevant to an embodiment of the present invention.

FIG. 2 is a plan view of the magnetic disk drive 10 with the cover thereof removed in a state in which the actuator 50 is stopped, namely, a state in which the actuator 50 is unloaded. The upper yoke of the VCM 53 is removed to facilitate understanding of the construction of the actuator 50.

Indicated at 40 is a HGA provided with a magnetic head (not shown) for performing writing or reading of the input-output data with a host computer, to or from the magnetic disk. The magnetic head is provided with a recording device for converting electric signals representing data to be written to the magnetic disk 11 into corresponding magnetic fields and a reproducing device for converting magnetic fields created by the magnetic disk 11 into corresponding electric signals which are formed in a unit. The recording device and the reproducing device may be separately formed. Embodiments of the present invention are applicable also to a magnetic disk drive provided with only either of a recording device and a reproducing device. The magnetic head is formed on a side surface of the head slider 41. The head slider 41 is attached to a suspension 42 to form the HGA 40.

The electric signals are transmitted through a signal transmission channel formed in a flexible cable 45 attached to the actuator 50. A temperature sensor (not shown) is attached to a part of the flexible cable 45 to measure temperature inside the disk enclosure.

The actuator 50 has a carriage 52 and the voice coil motor (VCM) 53, namely, a driving mechanism. The carriage 52 includes the HGA 40, an arm 54 and a coil support 55 arranged and connected in that order from a tip part provided with the head slider 41. The suspension 42 supports the head slider 41 at a point by a dimple (not shown) formed in a surface thereof facing the magnetic disk 11.

The coil support 55 holds a flat coil 56 thereon such that the flat coil 56 lies between magnets attached to the VCM 53.

A tab (not shown) is formed at the tip of the suspension 42. The tab moves onto the ramp 57 to separate the head slider 41 from the magnetic disk 11. The ramp 57 is disposed close to the circumference of the magnetic disk d11 and is attached to the bottom wall or a side wall of the base 12.

The VCM 53 swings the actuator 50 on the pivot assembly 51 according to drive signals given by a VCM driver, namely, a drive circuit, to the flat coil 56 to move the head slider 41 above the recording surface of the magnetic disk 11. The VCM 53 can move the head slider 41 from a position above the recording surface of the magnetic disk onto the ramp 57.

To write data to or to read data from the magnetic disk 11, the actuator 50 moves the head slider 41 to place the slider 41 above the data area in the surface of the rotating magnetic disk 11. As the actuator 50 swings, the head slider 41 moves above the recording surface of the magnetic disk 11 in a direction parallel to the radius of the magnetic disk 11. Thus the head slider 41 can be located at a position corresponding to a desired track on the magnetic disk 11. A pressure generated by the agency of the viscosity of air in a space between the floating surface of the head slider 41 facing the magnetic disk 11 and the surface of the rotating magnetic disk 11 counterbalances a pressure applied by the suspension 42 toward the magnetic disk 11 to keep the head slider 41 flying above the magnetic disk 11 at a fixed height from the magnetic disk 11.

Upon the stop of the rotating magnetic disk 11, the floating head slider 41 lands on the surface of the magnetic disk 11. The data area of the magnetic disk 11 is damaged or the respective surfaces of the magnetic disk 11 and the head slider 41 adhere to each other if the head slider 41 comes into contact with the magnetic disk 11 and, consequently, the magnetic disk 11 is restrained from rotation. Therefore, when the rotation of the magnetic disk 11 is stopped, the actuator 50 is moved to cause the head slider 41 to be retracted (unloaded) from the data area onto the ramp 57. The actuator 50 is turned toward the ramp 57, the tab at the tip of the suspension 42 slides along the surface of the ramp 57 to a parking surface, namely, stopping surface, in the surface of the ramp 57. Thus the head slider 41 is unloaded from the magnetic disk 11 and is moved to the home position. To load the head slider 41, the HSA 50 held on the parking surface is separated from the ramp 57 and is moved to a position above the surface of the magnetic disk 11.

The magnetic disk 11 is a nonvolatile recording medium having a magnetic layer to be magnetized to record data. The magnetic disk 11 is rotated on the spindle of the spindle motor 30 at a predetermined rotating speed. Plural concentric, circular tracks, namely, data storage areas, are formed in the surface of the magnetic disk 11. Each of the tracks is divided into plural circumferential data sectors.

Plural servo areas corresponding to a servo sampling frequency are arranged in a circumferential direction in the surface of the magnetic disk 11. Data sectors are formed in synchronism with the servo areas. The magnetic disk drive 10 is connected to a host computer (not shown) and is used as an external storage device. The host computer and the magnetic disk drive 10 exchange data.

A latch mechanism in an embodiment will be described.

Figure 3:
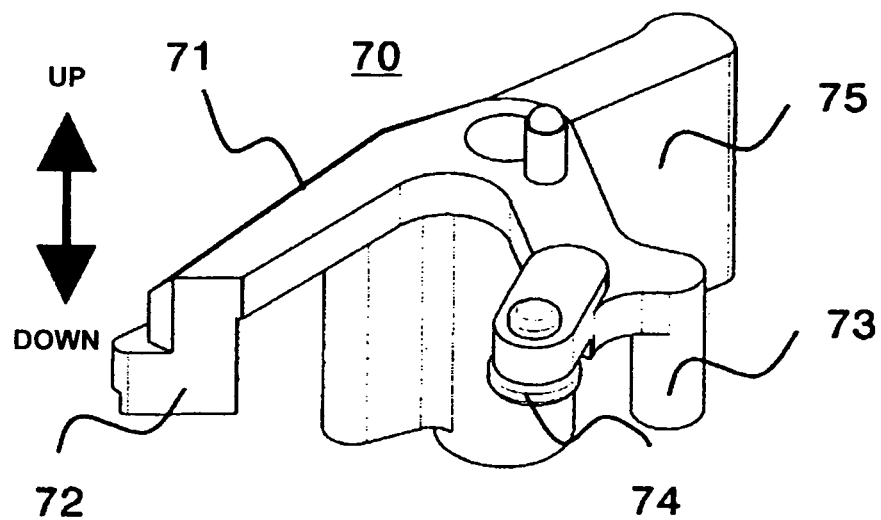
FIG. 3 is a perspective view of a latch in an embodiment of the present invention.
Figure 3:
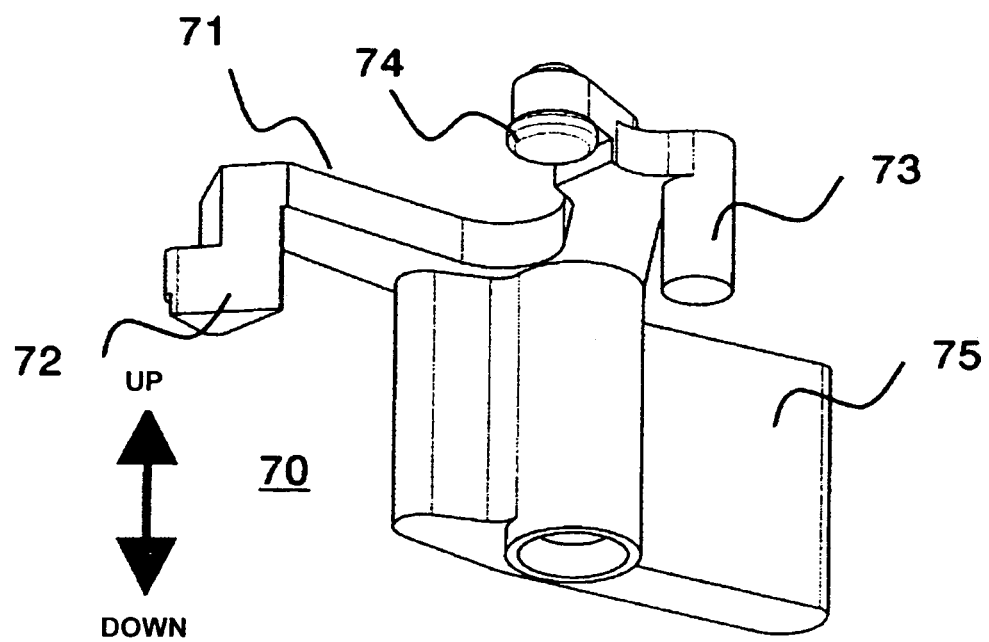

FIG. 3 is a perspective view of a latch 70 in an embodiment. The latch 70 has a latch lever 71 and a hook 72 extending vertically downward from the latch lever 71. The hook 72 engages with the left end part of the coil support 55. A bar 73 extends vertically downward from the latch lever 71. The bar 73 comes into contact with the left side surface of the coil support 55. A steel pin 74 is attached to a part near the bar. The latch 70 is provided with a counterweight 75 disposed such that the center of gravity of the latch is within the diameter of a bore formed in the latch lever to receive a pivotal pin to balance the latch. The hook 72 and the bar 73 are spaced apart from each other by a predetermined angle about the center of the bore formed in the latch lever. Thus the latch lever 71 has two arms. The bar 73 has a shape resembling a circular cylinder. Therefore, the bar 73 is in contact with the left side surface of the coil support 55 always in the same condition even if the contact point where the bar 73 is in contact with the left side surface of the coil support 55 moves according to the movement of the actuator. The hook 72 has a flat contact surface that ensures the engagement of the left end part of the coil support 55 and the hook 72.

Figure 4:
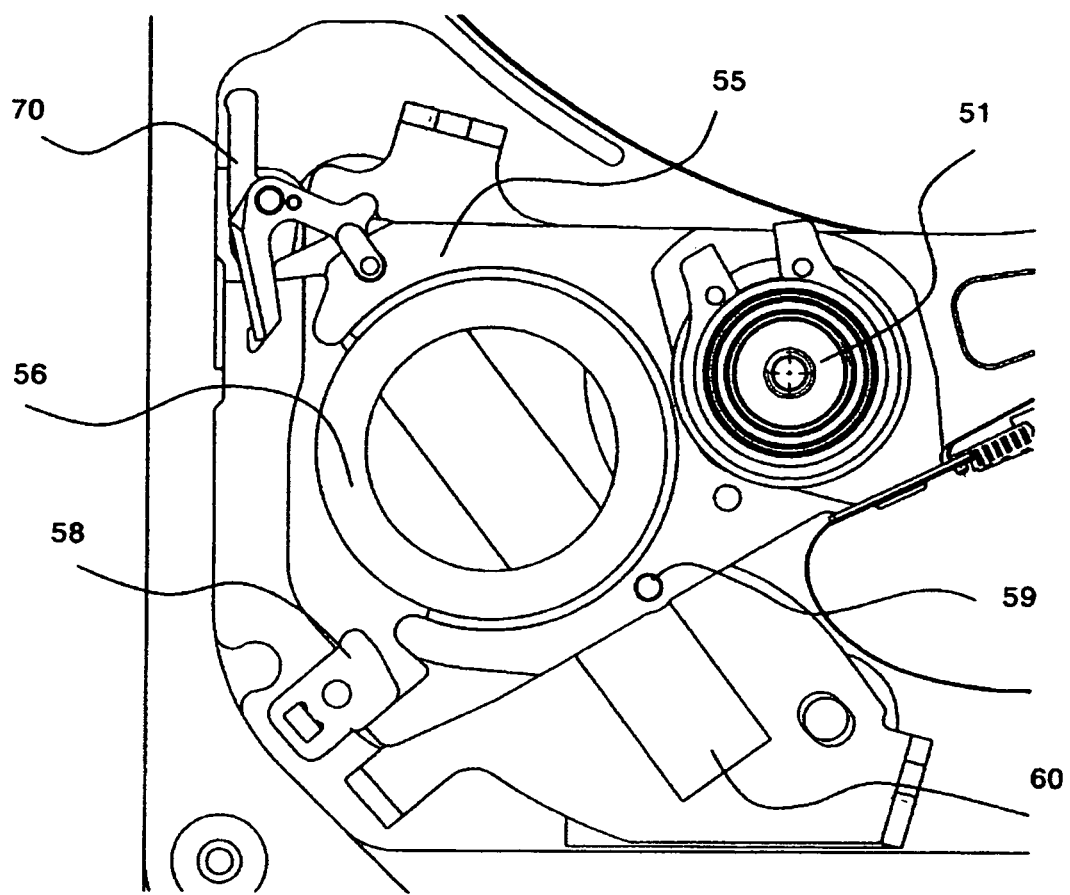
FIG. 4 is a plan view showing the arrangement of parts of a magnetic disk drive employing the latch of an embodiment of the present invention at a home position.

FIG. 4 is a plan view showing the positional relation of the latch 70 and a crash stop 58 with the actuator 50 at the home position of the magnetic disk drive 10 in an embodiment. A pin 59 of a metal, such as SUS430 or the like, is attached to the coil support 55. When the actuator 50 is at the home position, the pin 59 is attracted magnetically by the magnet 60 of the VCM 53, and the actuator 50 is held at the home position with a right end part of the coil support pressed against the crash stop 58. The pin 59 and the magnet 60 form a magnetic latch.

Similarly, the steel pin 74 attached to the latch lever 70 is attracted magnetically by the magnet 60 of the VCM 53, so that the latch 70 is urged clockwise on the pivotal pin. When the actuator 50 is at the home position, the latch 70 is held in a state in which the bar of the latch is in contact with the left side surface of the coil support 55 of the actuator 50 pressed against the crash stop 58 (explained as above). The hook and the bar extend vertically downward from the latch lever, and the latch lever is disposed so as to overlap the coil support three-dimensionally. Therefore, when the actuator 50 is at the home position, the latch lever can be disposed so as to overlap a route along which the hook at the left end part of the coil support moves. Thus, the latch mechanism can be installed in a limited space in designing the magnetic disk drive.

The steel pin 74 lies on the extension of the arm provided with the bar, of the latch lever 71. The distance between the steel pin 74 and the outer edge of the VCM magnet dominates a biasing force that acts on the latch and is an important factor that determines a time in which the latch changes from a closed state to an open state. Similarly, the steel pin 74 of the latch lever 70 is disposed so as to overlap the coil support 55 three-dimensionally. That is, since the steel pin 71 is disposed so as to overlap the coil support 55, the distance from the outer edge of the VCM magnet can be properly determined regardless of the moving range of the actuator 50. The moving range of the steel pin 71 moving together with the actuator 50 is limited to a predetermined range from the outer edge of the VCM magnet.

The latch relating to this embodiment includes (1) the hook 72 that engages with the left end part of the coil support 55, (2) the bar 73 pushed by the left side surface of the coil support 55, (3) the steel pin 74 to which the VCM magnet applies a biasing force, and (4) the counterweight 75. The hook 72, the bar 73 and the latch bar 71 having the two arms are formed integrally in a one-piece structure, The latch characterized by the three-dimensional shape thereof can be incorporated into the magnetic disk drive by the following simple sequential steps. (1) The actuator 50 and the VCM 53 are mounted on the base. (2) The magnetic head attached to the actuator 50 is moved to the home position on the ramp 57. (3) The latch 70 is put on the pivotal pin for supporting the latch with the actuator 50 held at the home position.

The principle of operation of the latch in this embodiment will be described below.

Figure 5:
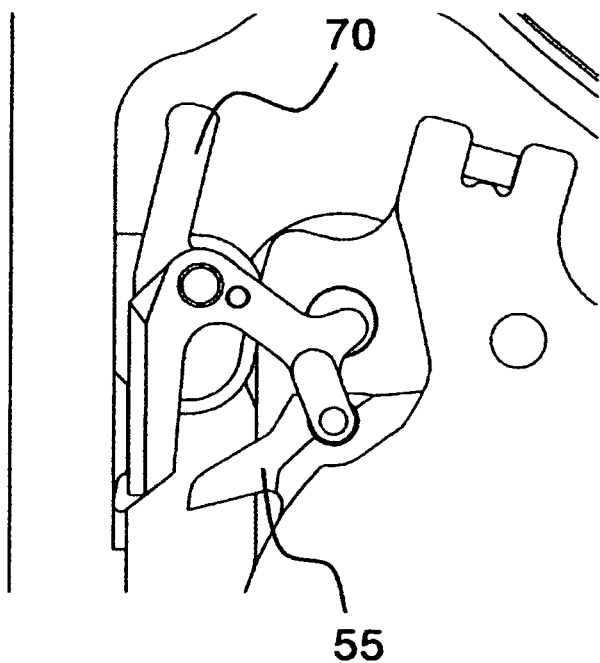
FIGS. 5(a) and 5(b) are plan views showing the positional relation between the latch in an embodiment and an actuator when a power supply is connected.
Figure 5:
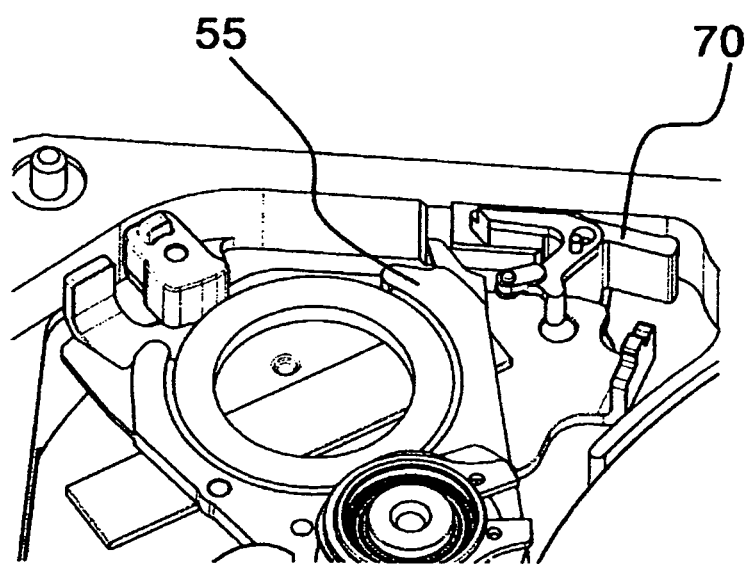

A method of releasing the actuator 50 at a starting stage will be described. The magnetic disk drive is connected to a power supply. The actuator 50 is turned counterclockwise from the home position on the pivot 51 after the magnetic disk has reached steady-state rotation. When the actuator 50 is turned, a current is supplied to the flat coil 56 to generate a driving force higher than the attractive force acting on the pin 59. The latch 70 is turned clockwise by the biasing forces as the actuator 50 moves and is held in a state in which the latch lever 71 is in contact with the inside surface of the base. In this state, the hook of the latch is separated from the moving route of the hook of the left end part of the coil support 55 and hence the latch does not engage with the actuator, i.e., the latch is in an open state (see FIGS. 5(a) and 5(b)). FIGS. 5(a) and 5(b) are a plan view and a perspective view, respectively, of the latch in the open state.

A method of holding the actuator 50 when the operation is ended will be described. The magnetic disk drive is disconnected from the power supply, a current generated by the induced electromotive force is supplied to the flat coil 56, and the actuator 50 is turned clockwise on the pivot assembly 51. After the magnetic head has been unloaded and retracted onto the ramp 57, the pin 59 is attracted by the magnetic force of the magnet 60 of the VCM 53. The actuator 50 is held in a state in which the right end part of the coil support is pressed against the crash stop 58. When the actuator 50 is held at the home position, the side surface of the coil support of the actuator is in contact with the bar of the latch lever.

Figure 6:
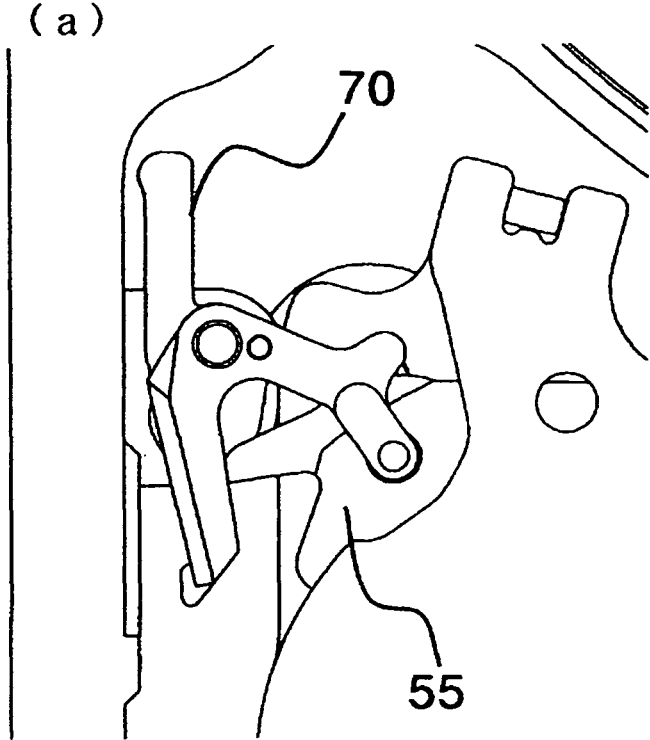
FIGS. 6(a) and 6(b) are plan views showing the positional relation between the latch in an embodiment and the actuator when a power supply is disconnected.
Figure 6:
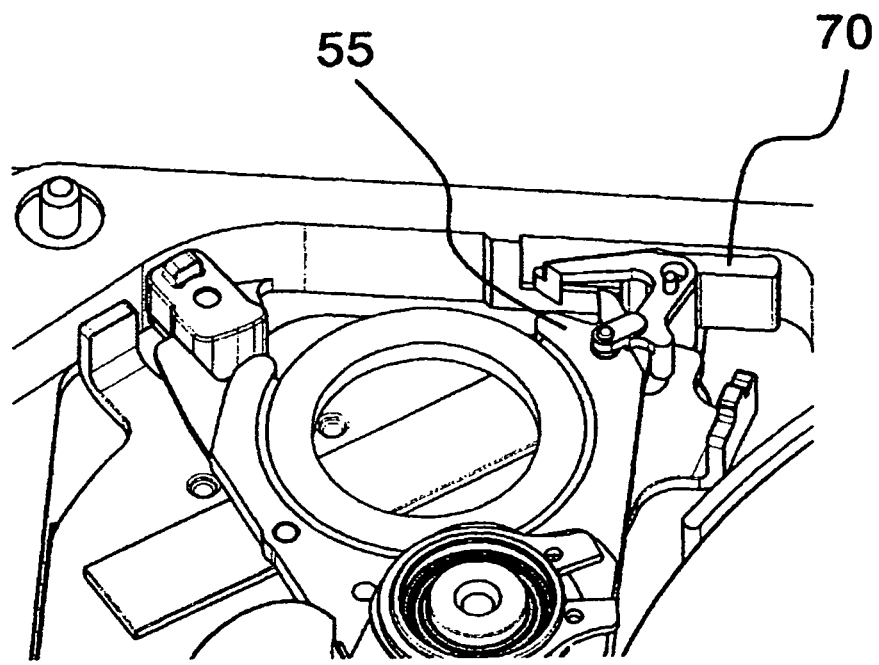

When the actuator 50 is moved, the left end surface of the coil support 55 comes into contact with the bar 73 of the latch to turn the latch counterclockwise. When the actuator 50 is at the home position, the hook of the latch is on the moving route of the hook of the left end part of the coil support 55 and the latch is in the closed state (see FIG. 6).

The hook that engages with the latch is formed at the tip of the coil support of the actuator. When the actuator is at the home position, the hook of the latch lever is located so as to obstruct the turning of the magnetic head in a loading direction from the home position on the ramp 57 toward a position above the magnetic disk. When the magnetic disk drive is disconnected from the power supply, the latching mechanism is held in the closed state (normal close). FIGS. 6(a) and 6(b) are a plan view and a perspective view, respectively, of the latching mechanism in the closed state.

Actions that occur when an external shock is given to the magnetic disk drive while the magnetic disk drive is not in operation will be described. The external shock has component forces respectively acting in different directions including a moment of force that turns the magnetic disk drive. When such a moment of force acts on the magnetic disk drive, the actuator 50 is turned directly in a magnetic head loading direction, namely, a clockwise direction, or the actuator 50 collides against the crash stop 58 or rebounds from the crash stop 58 depending on the acting direction of the moment of force. Consequently, the actuator is turned indirectly in the magnetic head loading direction, namely, a clockwise direction.

Figure 7:
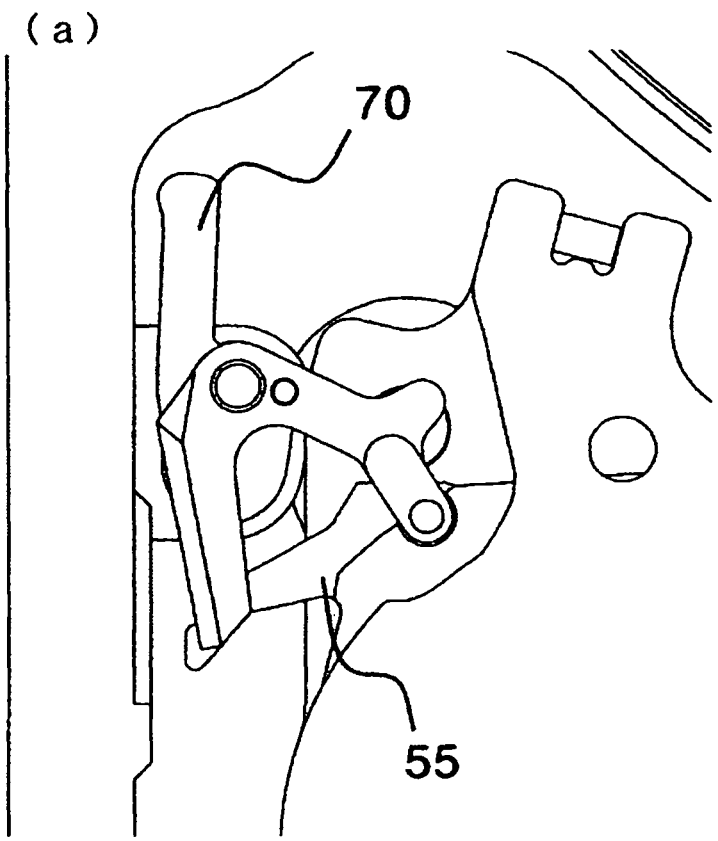
FIGS. 7(a) and 7(b) are plan views showing the positional relation between the latch in an embodiment and the actuator when an external shock is given.
Figure 7:
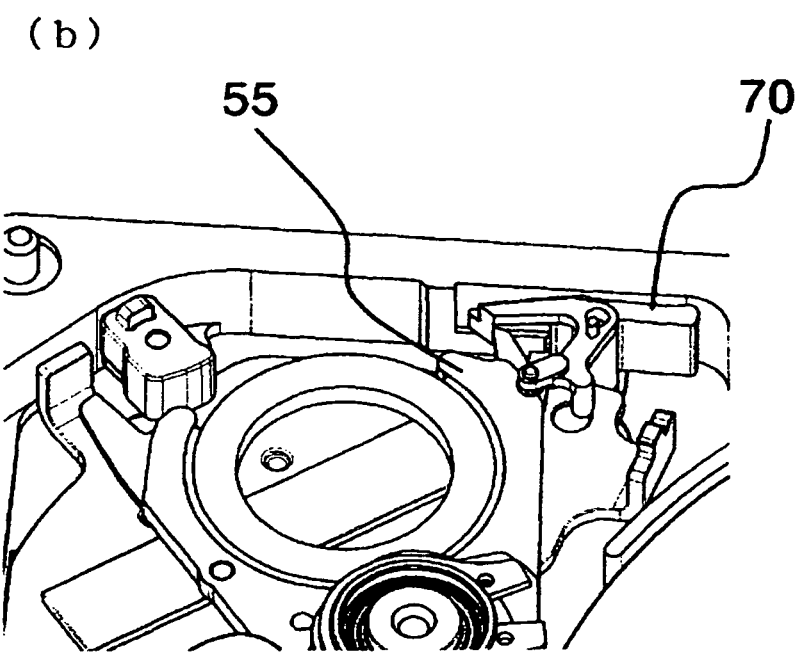

As mentioned above, the latch moves in the opening direction when the actuator moves. Generally, the duration of an external shock is on the order of several milliseconds at the longest and the moving speed of the actuator 50 moved by a shock is very high as compared with the moving speed of the latch. Therefore, even if the actuator starts moving by a shock, the latch will not be set in the open state and hence the hook 72 of the latch can still remain engaged with the hook of the left end part of the coil support 55. Thus the magnetic head will not be loaded to the magnetic disk (see FIGS. 7(a) and 7(b)). FIGS. 7(a) and 7(b) are a plan view and a perspective view, respectively, of the actuator restrained from turning.

The operation of the latching mechanism is based on a time in which the latch changes from the closed state to the open state. When the magnetic disk drive is started, the start of the actuator 50 is delayed by that time to disengage the latch. When an external shock is given to the magnetic disk drive, the latch is engaged by using a condition that the moving speed of the actuator 50 is very short as compared with that time, i.e., the actuator 50 moves at a high moving speed.

More concretely, a time in which the latch in this embodiment turns from the closed state to the open state is estimated taking the dimensional accuracy of parts and assembling accuracy to be between about 8 and about 20 ms. The actuator 50 is driven in a time on the order of 40 ms, which is twice to five times the moving time of the latch, at the start of the magnetic disk drive to disengage the latch.

It is required that the latch does not disengage (1) when a rotational shock of an amplitude of 30,000 rad/s$^2$ is given for a duration of 1 ms to the magnetic disk drive and (2) when a rotational shock of an amplitude of 20,000 rad/s$^2$ is given to the magnetic disk drive for a duration of 2 ms.

Figure 8:
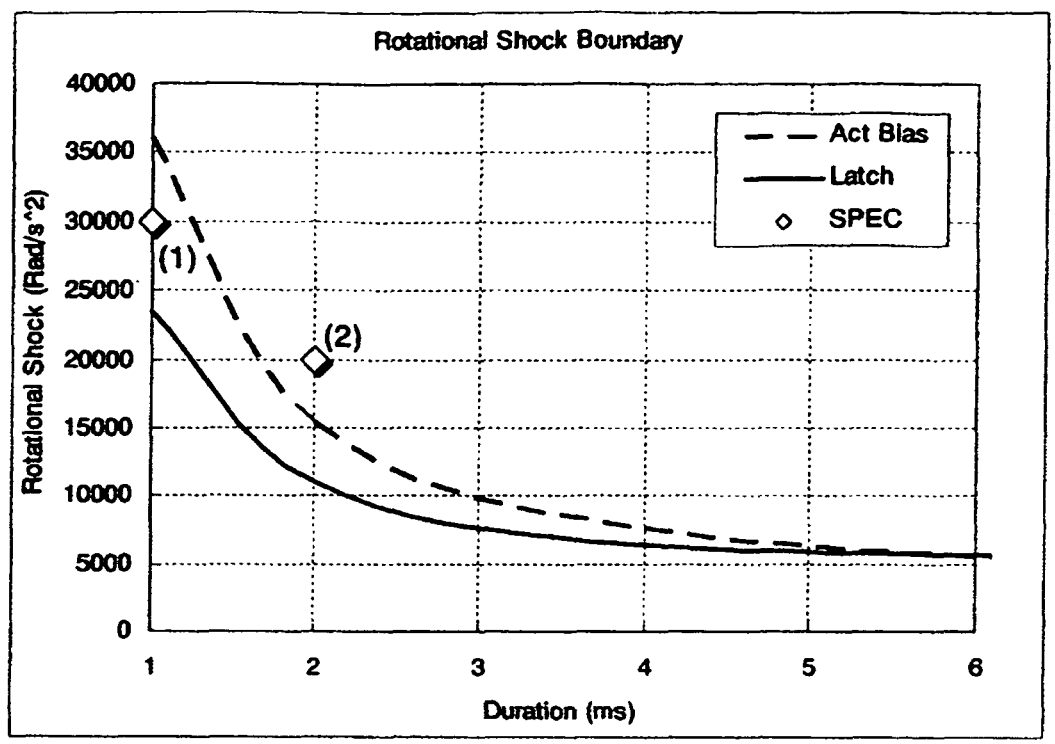
FIG. 8 is a graph showing the variation of limit of operation of the latch in an embodiment included in the magnetic disk drive.

FIG. 8 is a graph showing the variation of limit rotational shock to the latch with the duration of rotational shock, in which a dotted curve indicates the variation of rotational shock with duration for latching operation by the holding force of the magnet 60 acting on the pin 59 attached to the coil support 55 when the actuator is at the home position. Values in an area under the curve indicate conditions for the latch to be effective (magnetic latch). A solid curve indicates the variation of rotational shock with duration for the latching operation of the latch mechanism. Values in an area over the curve indicate conditions for effective latching under shocks (inertial latch). When the external shock is comparatively low and the holding force of the magnet 60 effective in holding the actuator 50 at the home position is higher than the external shock, the actuator 50 can be held at the home position only by the holding force of the magnet 60 without relying on the latching mechanism.

In the graph shown in FIG. 8, the rotational shock (1) is in an area between the dotted curve and the solid curve. Therefore, the actuator 50 can be latched by either of the holding force of the magnet or the latching mechanism. The rotational shock (2) is in an area over the dotted line and also in an area over the solid line. Therefore, the actuator 50 cannot be held only by the attractive force of the magnet and can be latched only by the agency of the latching mechanism. It is known that the reduction of the holding force for cost reduction is compensated by the latching mechanism.

Although the invention has been described in terms of the particular embodiments shown in the drawings, the present invention is not limited thereto in its practical application. It goes without saying that any known matters having the effect of embodiments of the present invention may be employed. For example, the latching mechanism according to embodiments of the present invention is applicable not only to magnetic disk drives provided with a ramp and a magnetic head moved for loading and unloading, but also to magnetic disk drives provided with a magnetic head operated in a contact start/stop mode.

What is claimed is:

1. An actuator latching mechanism, for a magnetic disk drive, for latching an actuator included in the magnetic disk drive at its home position when a shock is given to the magnetic disk drive with the actuator positioned at the home position, said actuator latching mechanism comprising:
   a hook, wherein the hook extends vertically downward from a first arm of a latch lever, said hook extending outward past said first arm and having a surface below and parallel to a surface of said first arm; and
   a bar, wherein the bar extends vertically downward from a second arm of the latch lever, and has a shape resembling a circular cylinder, and the hook, the bar and the latch lever are formed integrally in a one-piece structure.

2. The actuator latching mechanism according to claim 1, wherein the latch lever, and a part formed on a coil support part of the actuator and capable of engaging with or of coming into contact with said latch lever, are arranged so as to overlap each other three-dimensionally in a state in which the actuator is at the home position.

3. The actuator latching mechanism according to claim 2 further comprising a steel pin which is attracted by a magnet included in a voice coil motor.

4. The actuator latching mechanism according to claim 3, wherein the steel pin is on an upper side of the coil support part of the actuator in a state in which the actuator is at the home position.

5. The actuator latching mechanism according to claim 4 further comprising a counterweight on the opposite side of the hook or the bar with respect to a pivotal pin supporting said latch lever, and a center of gravity of the latch lies within a diameter of an opening formed in the latch lever to receive the pivotal pin.

6. A magnetic disk drive comprising:

a magnetic disk having a data area;

a spindle motor combined with the magnetic disk to rotate the magnetic disk;

an actuator for moving a magnetic head above the magnetic disk;

an actuator latching mechanism for holding the actuator at a home position when a shock is given to the magnetic disk drive with the actuator held at the home position; and wherein the actuator latching mechanism comprises a hook that extends vertically downward from a first arm of a latch lever, said hook extending outward past said first arm and having a surface below and parallel to a surface of said first arm, and a bar that extends vertically downward from a second arm of the latch lever, and has a shape resembling a circular cylinder, and the hook, the bar and the latch lever are formed integrally in a one-piece structure.

7. The magnetic disk drive according to claim 6, wherein the latch lever, and a part formed in a coil support part of the actuator and capable of engaging with or of coming into contact with said latch lever, are arranged so as to overlap each other three-dimensionally in a state in which the actuator is at the home position.

8. The magnetic disk drive according to claim 7, wherein the actuator latching mechanism further comprises a steel pin which is attracted by a magnet included in a voice coil motor.

9. The magnetic disk drive according to claim 8, wherein the steel pin is on an upper side of the coil support part of the actuator in a state in which the actuator is at the home position.

10. The magnetic disk drive according to claim 9, wherein the actuator latching mechanism further comprises a counterweight on the opposite side of the hook or the bar with respect to a pivotal pin supporting said latch lever, and a center of gravity of the latch lies within a diameter of an opening formed in the latch lever to receive the pivotal pin.

11. The magnetic disk drive according to claim 6, wherein the actuator positioned at the home position is held at the home position by an attractive force exerted by a magnet included in a voice coil motor on a pin attached to a coil support part.

* * * * *